(12) United States Patent
Kennedy (10) Patent No.: US 8,181,251 B2
(45) Date of Patent: May 15, 2012

(54) METHODS AND SYSTEMS FOR DETECTING MALWARE

(75) Inventor: Mark Kennedy, Redondo Beach, CA (US)

(73) Assignee: Symantec Corporation, Mountain View, CA (US)

( * ) Notice: Subject to any disclaimer, the term of this patent is extended or adjusted under 35 U.S.C. 154(b) by 588 days.

(21) Appl. No.: 12/338,877

(22) Filed: Dec. 18, 2008

(65) Prior Publication Data

US 2010/0162395 A1    Jun. 24, 2010

(51) Int. Cl.
*H04L 29/06* (2006.01)
(52) U.S. Cl. ............... 726/23; 726/22; 726/24; 726/25; 713/100; 709/201; 709/217
(58) Field of Classification Search .............. 726/22–25; 713/100; 709/201, 217
See application file for complete search history.

(56) References Cited

U.S. PATENT DOCUMENTS

| | | | | |
|---|---|---|---|---|
| 7,461,339 B2 * | 12/2008 | Liao et al. | ...................... | 715/239 |
| 2008/0134326 A2 * | 6/2008 | Abad | ............................. | 726/22 |
| 2009/0013405 A1 * | 1/2009 | Schipka | ......................... | 726/22 |
| 2009/0133125 A1 * | 5/2009 | Choi et al. | ..................... | 726/24 |
| 2009/0133126 A1 * | 5/2009 | Jang et al. | ...................... | 726/24 |

OTHER PUBLICATIONS

Ye et al., "An Intelligent PE-malware detection system based on association mining", (Feb. 2008), Journal of Computer Virology 4:323-334.*
Microsoft, "Portable Executable and CCommon Object File Format Specification", pp. 1-73, Feb. 1999. http://www.ush.it/team/ascii/pecoff.pdf.*
Hnatiw, Nick et al.; "'Pimp My PE': Parsing Malicious and Malformed Executables'; (accessed May 14, 2009); http://www.sunbelt-software.com/ihs/alex/vb07_paper.pdf.

* cited by examiner

*Primary Examiner* — Vivek Srivastava
*Assistant Examiner* — Hee Song
(74) *Attorney, Agent, or Firm* — Advantedge Law Group (57) ABSTRACT

A method for detecting malware is disclosed. The method may include examining a plurality of metadata fields of a plurality of known-clean-executable files. The method may also include examining a plurality of metadata fields of a plurality of known-malicious-executable files. The method may further include deducing, based on information obtained from examining the plurality of metadata fields of the plurality of known-clean- and known-malicious-executable files, metadata-field attributes indicative of malware. Corresponding systems and computer-readable media are also disclosed.

16 Claims, 6 Drawing Sheets

Executable File
300

METHODS AND SYSTEMS FOR DETECTING MALWARE

BACKGROUND

Consumers and businesses increasingly rely on computers to store sensitive data. Consequently, malicious programmers seem to continuously increase their efforts to gain illegitimate control and access to others computers. Computer programmers with malicious motivations have created and continue to create viruses, Trojan horses, worms, and other programs meant to compromise computer systems and data belonging to other people. These malicious programs are often referred to as malware.

Security software companies are combating the growing tide of malware by creating and deploying malware signatures (e.g., hash functions that identify malware) to their customers on a regular basis. However, a significant amount of malware has not yet been identified. What is needed, therefore, is a process for detecting unidentified malware.

SUMMARY

Embodiments of the instant disclosure are directed to detecting a malicious file based on one or more metadata-field attributes of the malicious file. For example, an examination module may examine a plurality of metadata fields of a plurality of known-clean-executable files. The examination module may also examine a plurality of metadata fields of a plurality of known-malicious-executable files. A deduction module may deduce metadata-field attributes indicative of malware based on information gathered by examining the plurality of metadata fields of the plurality of known-clean- and known-malicious-executable files.

In some embodiments, a security module may use the information deduced from the examination of the metadata fields of the plurality of the known-clean- and known-malicious-executable files to determine whether an unknown-executable file comprises malware. For example, the security module may receive an unknown-executable file. The security module may then determine whether the unknown-executable file comprises malware by determining whether the unknown-executable file comprises the metadata-field attributes indicative of malware.

In at least one embodiment, the security module may perform a security action if the unknown-executable file comprises malware. The security module may perform the security action by quarantining the unknown-executable file, reporting the unknown-executable file to a security vendor, adding the unknown-executable file to a list of malware files, and/or by performing any other suitable security action. Features from any of the above-mentioned embodiments may be used in combinations with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 1:
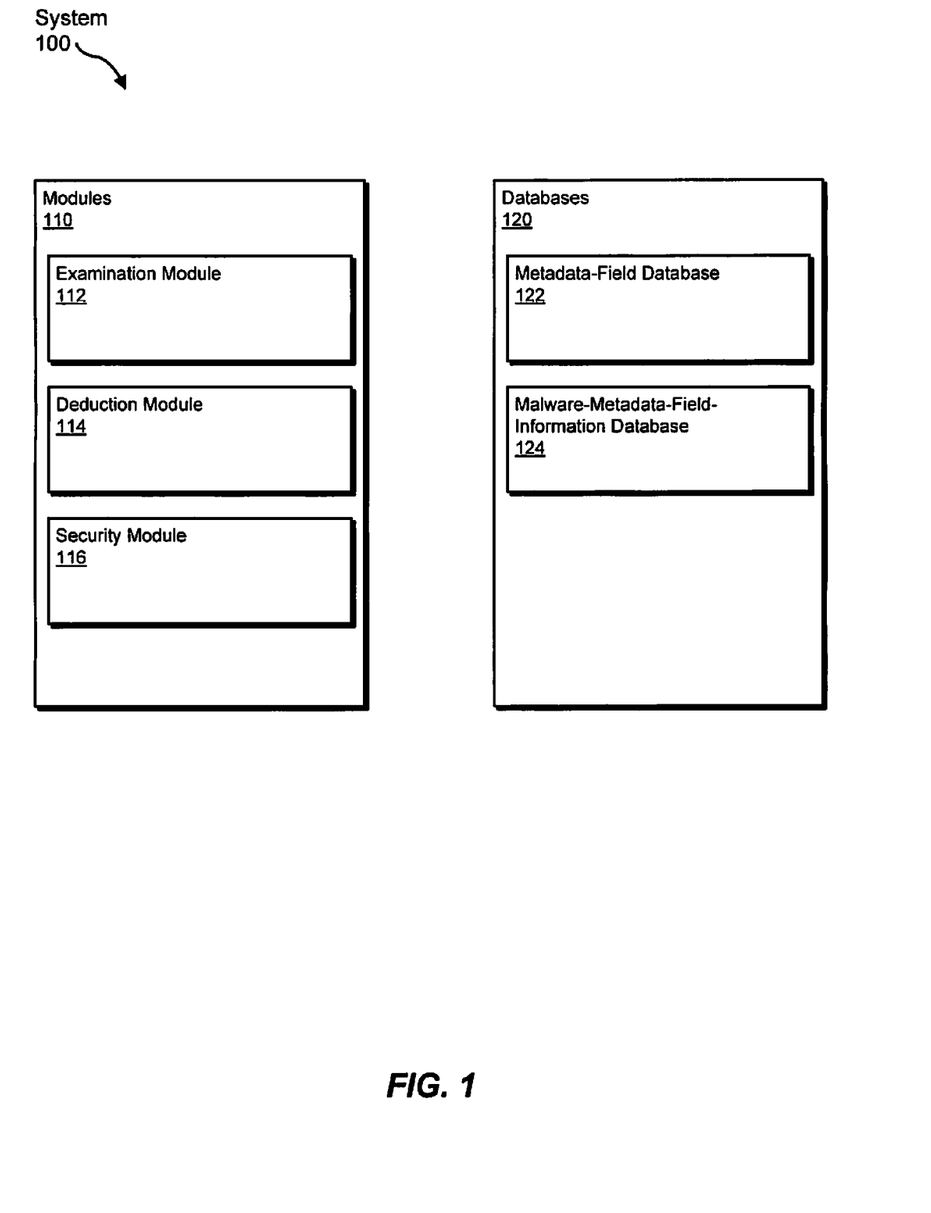
FIG. 1 is a block diagram of an exemplary system for detecting malware according to certain embodiments.
Figure 2:
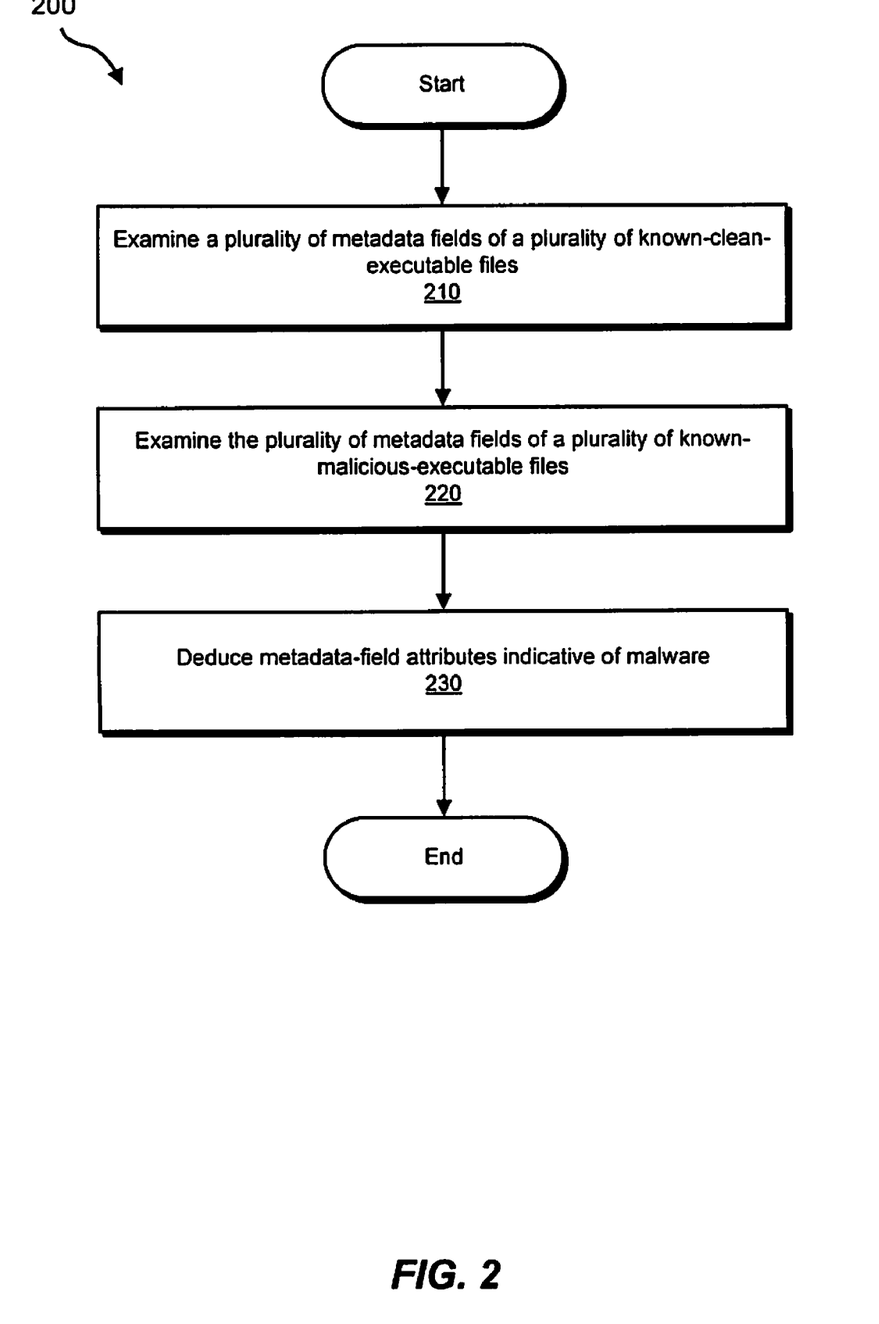
FIG. 2 is a flow diagram of an exemplary method for detecting malware according to certain embodiments.
Figure 3:
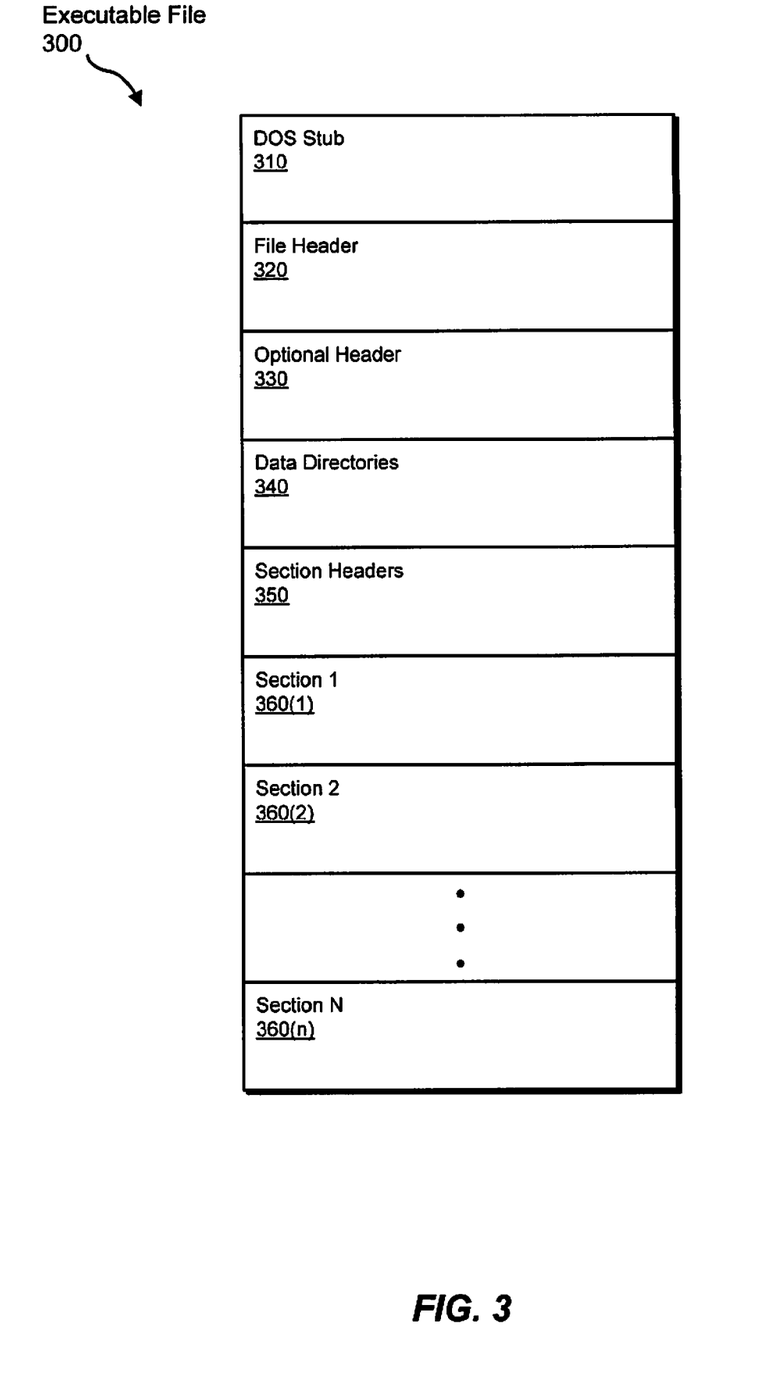
FIG. 3 is a block diagram of an exemplary executable file according to certain embodiments.
Figure 4:
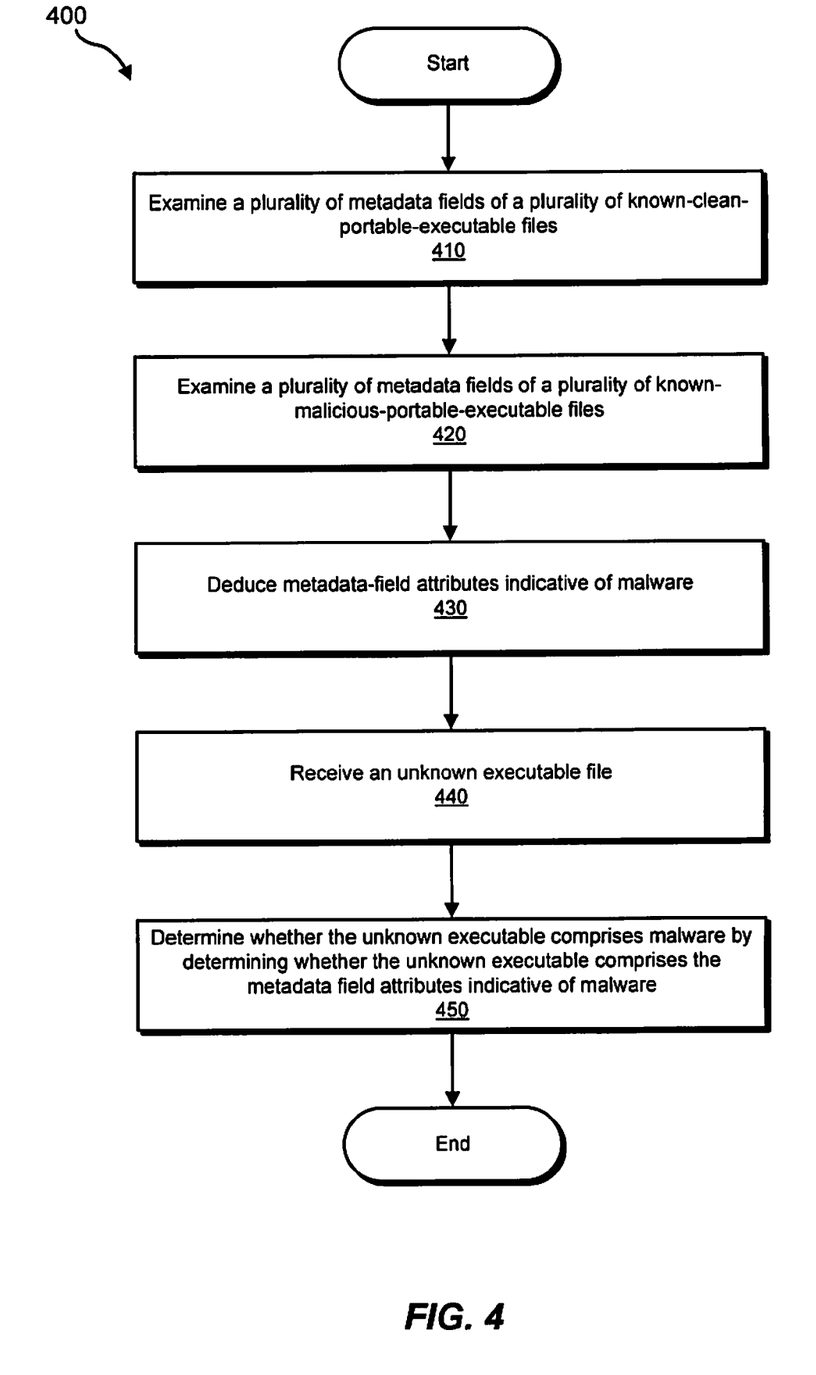
FIG. 4 is a flow diagram of an exemplary method for detecting malware according to certain embodiments.
Figure 5:
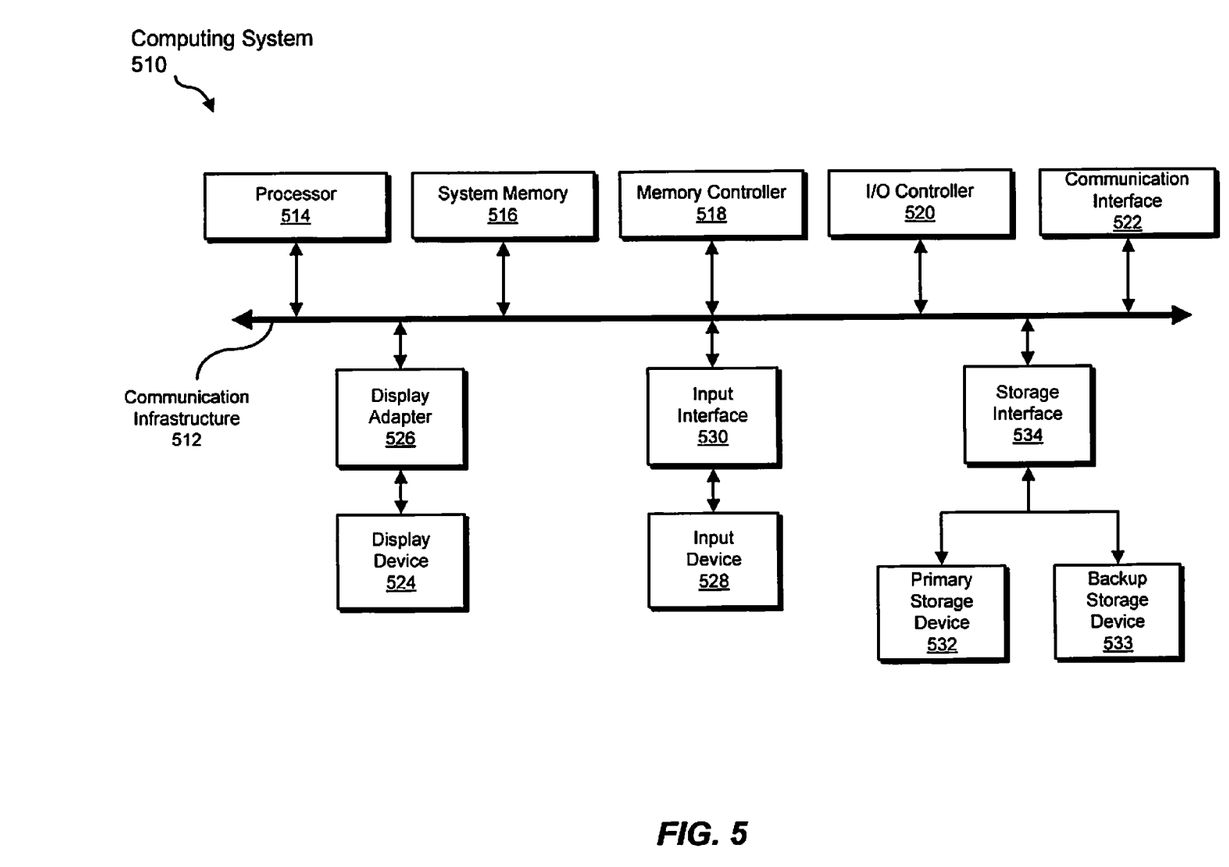
FIG. 5 is a block diagram of an exemplary computing system capable of implementing one or more of the embodiments described and/or illustrated herein.
Figure 6:
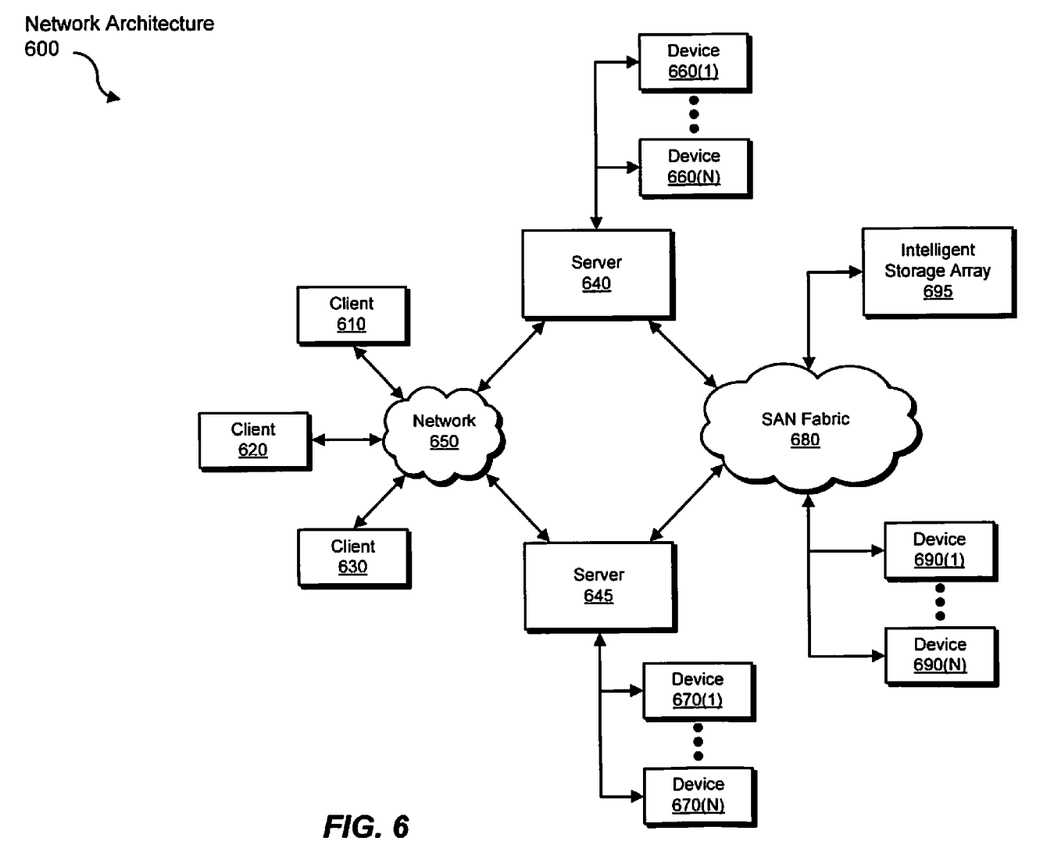
FIG. 6 is a block diagram of an exemplary computing network capable of implementing one or more of the embodiments described and/or illustrated herein.

As will be described in greater detailed below, the instant disclosure generally relates to methods and systems for detecting malware by examining know-clean- and and known-malicious-executable files and using information obtained during the examination to determine whether an unknown file comprises malware. FIG. 1 is a diagram of an exemplary system for examining known-clean- and known-malicious-executable files and determining whether an unknown-executable file comprises malware. FIG. 2 shows an exemplary process for examining known-clean- and known-malicious-executable files and deducing metadata attributes indicative of malware. FIG. 3 shows an exemplary Portable Executable (PE) file, and FIG. 4 shows an exemplary process for determining whether a PE file comprises malware. An exemplary computing system and an exemplary network for implementing embodiments of the present disclosure are shown in FIGS. 5 and 6.

FIG. 1 is a block diagram of an exemplary system 100. System 100 may include one or more modules 110 for performing one or more tasks. For example, modules 110 may include an examination module 112 for examining metadata fields of known-clean- and known-malicious-executable files. Metadata fields of executable files may include header fields and/or other fields of an executable file. Modules 110 may also include a deduction module 114 for deducing, based on information obtained from examining the known-clean- and known-malicious-executable files, metadata-field attributes indicative of malware. Modules 110 may include a security module 116, which may use the metadata-field attributes indicative of malware to determine whether an unknown-executable file comprises malware.

In certain embodiments, one or more of modules 110 in FIG. 1 may represent one or more software applications or programs that, when executed by a computing system, may cause the computing system to perform one or more steps disclosed herein. For example, as will be described in greater detail below, one or more of modules 110 may represent software modules configured to run on one or more computing devices, such as computing system 510 in FIG. 5 and/or portions of exemplary network architecture 600 in FIG. 6.

One or more modules 110 in FIG. 1 may also represent all or portions of one or more special-purpose computers configured to perform one or more of the tasks associated with steps disclosed herein.

System 100 may include databases 120. Databases 120 may include a metadata-field database 122, which may store a list of one or more metadata fields to be examined in known-clean- and known-malicious-executable files. Databases 120 may also include a malware-metadata-field-information database 124. Malware-metadata-field-information database 124 may include any information identifying metadata-field attributes indicative of malware and/or how metadata-field attributes may be indicative of malware. Metadata-field attributes indicative of malware may include one or more metadata-field attributes that, when found in an executable file, may indicate that the executable file comprises malware.

In some embodiments, malware-metadata-field-information database 124 may include information that indicates how to use the metadata-field attributes of malware to determine whether an unknown-executable file comprises malware. According to certain embodiments, malware-metadata-field-information database 124 may include any information derived from applying any suitable machine-learning algorithm to known-clean- and known-malicious-executable files. For example, malware-metadata-field-information database 124 may include weighting information for one or more metadata-field attributes that indicate the usefulness of metadata attributes in detecting malware.

In some embodiments, malware-metadata-field-information database 124 may include threshold information that indicates a threshold number. Security module 116 may determine that an executable file comprises malware if the number of metadata-field attributes of the executable file that match metadata-field attributes in malware-metadata-field-information database 124 is greater than or equal to the threshold number. Malware-metadata-field-information database 124 may additionally or alternatively include information that indicates one or more combinations of metadata-field attributes indicative of malware. In some embodiments, malware-metadata-field-information database 124 may include information that indicates that one metadata-field attribute indicative of malware is a stronger indicator of malware than another metadata-field attribute indicative of malware.

One or more of databases 120 in FIG. 1 may represent a portion of one or more computing devices. One or more of databases 120 may represent a portion of computing system 510 in FIG. 5, and/or portions of exemplary network architecture 600 in FIG. 6. Alternatively, one or more of databases 120 in FIG. 1 may represent one or more physically separate devices capable of being accessed by a computing device.

FIG. 2 shows a process that may be implemented by an examination module, such as examination module 112, a deduction module, such as deduction module 114, and/or a security module, such as security module 116. An examination module may examine a plurality of metadata fields of a plurality of known-clean-executable files (step 210). For example, the examination module may examine two or more metadata fields of two or more known-clean-executable files.

A known-clean-executable file may include any file that has been identified as being clean (i.e., a file that does not include malware). A metadata field of an executable file may be any field that carries information about and/or is associated with the executable file. For example, entries in the metadata fields of the executable files may set forth attributes of the executable files.

In some embodiments, a metadata field may include a static attribute for an executable file. As used herein, the phrase "static attribute" may refer to any attribute of a file that may be observed when the file is not being executed. In other words, a static attribute may be an attribute that can be determined based on examining information in the executable file. In contrast, a dynamic attribute may be an attribute that is observed based on execution of a file.

An executable file may be any file that includes code (i.e., instructions) that may be executed by a computer. An executable file may also be referred to as an executable or a binary. An executable file may be formatted according to any suitable executable file format. An example of an executable file format is a Portable Executable (PE) file format. PE-file formats may be file formats used in 32-bit and 64-bit versions of WINDOWS operating systems. Executable files may also include executables for LINUX operating systems, MAC operating systems, UNIX operating systems, and/or any other operating systems.

In addition to examining the known-clean-executable files, the examination module may examine a plurality of metadata fields of a plurality of known-malicious-executable files (step 220). For example, the examination module may examine two or more metadata fields of two or more known-malicious-executable files. A known-malicious-executable file may include any executable file known to include malware, such as a virus, a Trojan horse, a worm, and/or other programs meant to compromise computer systems and data. In some embodiments, the examination module may examine the same metadata fields in the known-clean-executable files and the known-malicious-executable files. In other embodiments, the examination module may examine one or more different metadata fields in the known-clean-executable files than in the known-malicious-executable files.

The examination module may examine metadata fields of executable files by determining attribute values in the metadata fields of the executable files. The examination module may store the information gathered during the examination (e.g., the attribute values) in a database, such as malware-metadata-field-information database 124.

After the examination module examines the known-clean- and known-malicious-executable files, a deduction module may deduce, based on information obtained during the examination, metadata-field attributes indicative of malware. As previously noted, the information obtained during the examination may include attribute information. The deduction module may process the attribute information to determine which attributes may be indicative of malware. The deduction module may use any suitable machine-learning algorithm to determine which attributes may be indicative of malware. The deduction module may also use any suitable machine-learning algorithm to determine how to use the metadata attributes to determine whether an unknown-executable file comprises malware. For example, the deduction module may determine which combinations of metadata attributes are indicative of a malicious-executable file. The deduction module may store any information regarding how to use metadata attributes to identify malware in a database, such as malware-metadata-field-information database 124.

Executable files may include a variety of types of metadata fields and corresponding attributes. For example, an executable file may include one or more debug-section fields for one or more debug-section attributes, one or more imports fields for one or more imports attributes, one or more symbol-table fields for one or more symbol-table attributes, one or more optional-header fields for one or more optional-header attributes, one or more characteristics fields for one or more characteristics attributes, one or more image-subsystem fields for one or more image-subsystem attributes, one or more base-of-image fields for one or more base-of-image attributes, one or more linker-version fields for one or more linker-version attributes, one or more size fields for one or more size attributes, and/or one or more Real Virtual Address (RVA) fields for one or more RVA attributes.

An executable file may also include one or more entry-point fields for one or more entry-point attributes, one or more code-section-base fields for one or more code-section-base attributes, one or more no-in-out fields for one or more no-in-out attributes, one or more Thread Level Speculation (TLS) fields for one or more TLS attributes, one or more has-certificate fields for one or more has-certificate attributes, one or more node fields for one or more node attributes, one or more alignment fields for one or more alignment attributes, one or more operating-system-version fields for one or more operating-system-version attributes, one or more image-version fields for one or more image-version attributes, one or more minimum-subsystem-version fields for one or more minimum-subsystem-version attributes, one or more Dynamic Link Library (DLL) characteristics fields for one or more DLL-characteristics attributes, one or more External Binding Facilities (EBFs) fields for one or more EBFs attributes, one or more stack-size fields for one or more stack-size attributes, one or more heap-size fields for one or more heap-size attributes, and/or one or more number-of-sections fields for one or more number-of-sections attributes.

Attributes described herein may be represented by any suitable type of data. For example, a debugging-section attribute may include a debugging-section integer, a symbol-table attribute may include a symbol-table-pointer integer and/or a number-of-symbols integer, an image-subsystem attribute may include a graphical-user-interface integer and/or a character-based-user-interface integer, and a linker-version attribute may include a major-linker-version integer and/or a minor-linker-version integer. An RVA attribute may include an RVA-entry-point integer, an RVA-start-of-code-section integer, an RVA-base-of-code-section integer, and/or an RVA-start-of-data-section integer.

An operating-system-version attribute may include a major-operating-system-version integer and/or a minor-operating-system-version integer. An image-version attribute may include a major-image-version integer and/or a minor-image-version integer. A minimum-subsystem-version attribute may include a major-subsystem-version integer and/or a minor-subsystem-version attribute. A size attribute may include an image-size integer, a code-section-size integer, an initialized-data-size integer, an uninitialized-data-size integer, and/or a header-size integer. An optional-header attribute may include any attribute in an optional header of an executable file.

An entry-point attribute may include an entry-point integer. A code-section-base attribute may include a code-section-base integer. An alignment attribute may include a section-alignment integer and/or a file-alignment integer. A DLL-characteristics attribute may include a DLL-characteristics integer, a stack-size attribute may include a size-of-stack-reserve integer and/or a size-of-stack-commit integer, and a heap-size attribute may include a size-of-heap-reserve integer and/or a size-of-heap-commit integer. A base-of-image attribute may include a base-of-image integer, and an EBFs attribute may include an EBFs integer. A no-in-out attribute may include a no-in-out integer, a has-certificate attribute may include a has-certificate integer, a number-of-sections attribute may include a number-of-sections integer, a node attribute may include a node integer, and a TLS attribute may include a TLS integer.

An imports attribute may include a has-imports integer, a has-delayed-imports integer, a urlmon-imports integer, a msvcrt-imports integer, an oleaut32-imports integer, a setupapi-imports integer, a user32-imports integer, an advapi32-imports integer, a shell32-imports integer, a gdi32-imports integer, a comdlg32-imports integer, and/or an imm32-imports integer. A characteristics attribute may include one or more characteristic flags for a variety of executable-file characteristics.

As mentioned, metadata-field attributes may represent a variety of characteristics of executable files. For example, a multiple of a section-alignment integer may be used to indicate where a section needs to be loaded. A multiple of a file-alignment integer may be an offset for starting a section. Major- and minor-operating-system-version integers may indicate a minimum-operating-system version needed to execute an executable file. Major- and minor-image-version integers may indicate versions of an executable file. Major- and minor-subsystem-version integers may indicate minimum subsystem versions required to execute an executable file. An image-size integer may indicate a size of an image after considering a section alignment. A header-size integer may indicate the total size of the headers of an executable file. A graphical-user-interface integer may include a flag indicating whether an executable file uses a graphical-user interface. A character-based-user-interface integer may include a flag indicating whether an executable file uses a character-based-user interface.

A size-of-stack-reserve integer may indicate the amount of address space that may need to be reserved for a stack. A size-of-stack-commit integer may indicate the amount of actual memory committed for a stack. A size-of-heap-reserve integer may indicate the amount of address space that may need to be reserved for a heap. A size-of-heap-commit integer may indicate the amount of actual memory committed for a heap. A symbol-table-pointer integer may be an offset to a symbol table. A number-of-symbols integer may indicate the number of symbols in a symbol table. A debugging-section integer may indicate whether an executable file has a debugging section. Major- and minor-linker-version integers may indicate the version of a linker that produced an executable file. A code-section-size integer may indicate the size of a code section in an executable file. An initialized-data-size integer may indicate a size of an initialized-data section in an executable file. An uninitialized-data-size integer may indicate a size of an uninitialized-data section in an executable file.

A urlmon-imports integer may indicate whether an executable file links to a urlmon.dll file. An msvcrt-imports integer may indicate whether an executable file links to an msvcrt.dll file. An oleaut32-imports integer may indicate whether an executable file links to an oleaut32.dll file. A setupapi-imports integer may indicate whether an executable file links to a setupapi.dll file. A user32-imports integer may indicate whether an executable file links to a user32-import.dll file. An advapi32-imports integer may indicate whether an executable file links to an advapi.exe file. A shell32-imports integer may indicate whether an executable file links to a shell32-imports.dll file. A gdi32-imports integer may indicate whether an executable file links to a gdi32.dll file. A comdlg32-imports integer may indicate whether an executable file links to a comdlg32.dll file. An imm32-imports integer may indicate whether an executable file links to an imm32.dll file.

As previously mentioned, an executable file may be in a PE-file format. FIG. 3 shows an example of an executable file 300 in a PE-file format. As shown in FIG. 3, executable file 300 may include a Disk Operating System (DOS) stub 310.

Executable file 300 may also include a file header 320. File header 320 may include one or more metadata fields. For example, file header 320 may include a machine field indicating a system that the binary is intended to run on, a number-of-sections field, a time-stamp field, a symbol-table-pointer field, a number-of-symbols field, a debugging-information field, an optional-header-size field, an image-file-relocation-stripped field, an image-file-executable-image field, an image-file-line-numbers-stripped field, a file-local-symbols-stripped field, an image-file-aggressive-working-set-trim field, an image-file-bytes-reversed-low field, an image-file-32-bit-machine field, an image-file-debug-stripped filed, an image-file-removable-run-from-swap field, an image-file-net-run-from-swap field, an image-file-system field, an image-file Dynamic Link Library (DLL) field, and/or an image-file-up-system-only field.

Executable file 300 may also include an optional header 330. Optional header 330 may include one or more metadata fields. For example, optional header 330 may include a major-linker-version field, a minor-linker-version field, a size-of-code field, a size-of-initialized-data field, a size-of-uninitialized-data field, an offset-to-the-codes-entry-point field, an address-of-entry-point field, an offset-to-the-base-of-code field, a base-of-data field, a section-alignment field, a file-alignment field, a major-operating-system-version field, a minor-operating-system-version field, a major-image-version field, a minor-image-version field, a major-subsystem-version field, a minor-subsystem-version field, a WINDOWS-32-bit Graphical User Interface (GUI) application field, a WINDOWS-32-bit-version-value field, a size-of-image field, a size-of-headers field, a check-sum field, and an image-subsystem-native field.

Optional header 330 may also include an image-subsystem-WINDOWS-GUI field, an image-subsystem-WINDOWS Character User Interface (CUI) field, an image-subsystem-OS/2-CUI field, an image-subsystem-POSIX-CUI field, a DLL-characteristics field, a process-attachment field, a thread-detachments field, a thread-attachments field, a process-detachments field, a size-of-stack-reserve field, a size-of-stack-commit field, a size-of-heap-reserve field, a size-of-heap-commit field, loader flags, and image-directory flags.

Executable file 300 may also include data directories 340 and section headers 350. Section headers 350 may include one or more metadata fields. For example, section headers 350 may include an image-size-shortening field, an image-section-header field, a virtual-address field, a size-of-raw-data field, a pointer-to-raw-data field, a pointer-to-relocations field, and a characteristics field, which may include one or more flags indicating one or more attributes of executable file 300. Executable file 300 may also include a section 1 360(1) through a section N 360(n).

FIG. 4 shows a method for detecting malware in portable-executable files. An examination module may examine a plurality of metadata fields of a plurality of known-clean-portable-executable files (step 410). The examination module may also examine a plurality of metadata fields of a plurality of known-malicious-portable-executable files (step 420). The examination module may examine any number of known-clean-portable-executable files and/or known-malicious-portable-executable files. For example, the examination module may examine tens, hundreds, thousands, hundreds of thousands, and/or millions of executable files. The examination module may also examine any number of metadata fields in the known-clean-portable-executable files and/or known-malicious-portable-executable files. After the executable files have been examined, a deduction module may deduce, based on the examination, metadata-field attributes indicative of malware (step 430).

A security module may use the information deduced by the deduction module to determine whether an unknown-executable file contains malware. For example, the security module may receive an unknown-executable file (step 440). The security module may determine whether the unknown-executable file comprises malware by determining whether the unknown-executable file comprises the previously identified metadata-field attributes that are indicative of malware.

In some embodiments, the security module may include or be part of an antivirus-security-software program. According to at least one embodiment, a client-computing device may include the security module, and the security module may protect the client-computing device by determining whether unknown files on the client-computing device comprise malware. The security module may also determine whether a file to be downloaded to the client-computing device comprises malware. In other embodiments, a server or any other computing device may include the security module.

In one example, 850,000 known-clean-executable files and 500,000 known-malicious-executable files were examined by an examination module. The information gathered during the examination was processed by a deduction module to determine header-field attributes indicative of malware. Based on the information deduced by the deduction module, a security module was able to identify approximately 50%-60% of malicious-executable files as being malicious while returning less than 0.5% false-positive determinations. One of ordinary skill in the art would not have expected such results.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may comprise at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the examining, deducing, receiving, determining, and/or performing steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may comprise both a volatile memory unit (such as, for example, system memory 516) and a non-volatile storage device (such as, for example, primary storage device 532, as described in detail below).

In certain embodiments, exemplary computing system 510 may also comprise one or more components or elements in addition to processor 514 and system memory 516. For example, as illustrated in FIG. 5, computing system 510 may comprise a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller may perform and/or be a means for performing, either alone or in combination with other elements, one or more of the steps or features described and/or illustrated herein, such as examining, deducing, receiving, determining, and/or performing.

I/O controller 520 generally represents any type or form of module capable of coordinating and/or controlling the input and output functions of a computing device. For example, in certain embodiments I/O controller may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the examining, deducing, receiving, determining, and/or performing steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network comprising additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 594 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the examining, deducing, receiving, determining, and/or performing steps disclosed herein. Communication interface 522 may also be used to perform and/or be a means for performing other steps and features set forth in the instant disclosure.

As illustrated in FIG. 5, computing system 510 may also comprise at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also comprise at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the examining, deducing, receiving, determining, and/or performing steps disclosed herein. Input device 528 may also be used to perform and/or be a means for performing other steps and features set forth in the instant disclosure.

As illustrated in FIG. 5, exemplary computing system 510 may also comprise a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also comprise other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, the exemplary file systems disclosed herein may be stored on primary storage device 532, while the exemplary file-system backups disclosed herein may be stored on backup storage device 533. Storage devices 532 and 533 may also be used, for example, to perform and/or be a means for performing, either alone or in combination with other elements, one or more of the examining, deducing, receiving, determining, and/or performing steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or to run certain software applications. Network 650 generally represents any telecommunication or computer network; including, for example, an intranet, a wide area network (WAN), a local area network (LAN), a personal area network (PAN), or the Internet.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the examining, deducing, receiving, determining, and/or performing steps disclosed herein. Network architecture 600 may also be used to perform and/or be a means for performing other steps and features set forth in the instant disclosure.

As detailed above, computing system 410 and/or one or more of the components of network architecture 500 may perform and/or be a means for performing, either alone or in combination with other elements, one or more steps of the exemplary methods described and/or illustrated herein. For example, a computing system may examine a plurality of metadata fields of a plurality of known-clean-executable files. The computing system may also examine a plurality of metadata fields of a plurality of known-malicious-executable files. The computing system may deduce, based on information obtained from examining the plurality of metadata fields of the plurality of known-clean- and known-malicious-executable files, metadata-field attributes indicative of malware.

In some embodiments, the computing system may receive an unknown-executable file. The computing system may determine whether the unknown-executable file comprises malware by determining whether the unknown-executable file comprises the metadata-field attributes indicative of malware. In at least one embodiment, the computing system may perform a security action if the unknown-executable file comprises malware.

According to various embodiments, the plurality of known-clean-executable files may comprise portable-executable files and the plurality of known-malicious-executable files may comprise portable-executable files. In at least one embodiment, the metadata-field attributes may comprise header-field attributes. According to certain embodiments, the header-field attributes comprise at least one of a debug-section attribute, an imports attribute, a symbol-table attribute, an optional-header attribute, a characteristics attribute, an image-subsystem attribute, a linker-version attribute, a size attribute, a real-virtual-address attribute, an entry-point attribute, a code-section-base attribute, an alignment attribute, an operating-system-version attribute, an image-version attribute, a minimum-subsystem-version attribute, a dynamic-link-library-characteristics attribute, a stack-size attribute, a heap-size attribute, a number-of-sections attribute, a no-in-out attribute, a thread-level-speculation attribute, and/or a base-of-image attribute.

In some embodiments, the metadata-field attributes indicative of malware comprise a subset of the plurality of metadata fields examined in the plurality of known-clean-executable files and known-malicious-executable files. In at least one embodiment, the metadata-field attributes indicative of malware may comprise static attributes. In various embodiments, deducing metadata-field attributes indicative of malware comprises determining at least one combination of metadata-field attributes indicative of malware. According to at least one embodiment, deducing metadata-field attributes indicative of malware comprises determining that a first metadata-field attribute indicative of malware is a stronger indicator of malware than a second metadata-field attribute indicative of malware.

In some embodiments, the metadata-field attributes indicative of malware comprise at least one of a debug-section attribute, a symbol-table attribute, an image-subsystem attribute, a linker-version attribute, a real-virtual-address attribute, an operating-system-version attribute, an image-version attribute, a minimum-subsystem-version attribute, a dynamic-link-library-characteristics attribute, a stack-size attribute, a heap-size attribute, and/or a number-of-sections attribute.

In some embodiments, the metadata-field attributes indicative of malware comprise at least two of a section-alignment integer, a file-alignment integer, a major-operating-system-version integer, a minor-operating-system-version integer, a major-image-version integer, a minor-image-version integer, a major-subsystem-version integer, a minor-subsystem-version integer, an image-size integer, a header-size integer, a graphical-user-interface integer, a character-based-user-interface integer, a size-of-stack-reserve integer, a size-of-stack-commit integer, a size-of-heap-reserve integer, a size-of-heap-commit integer, a symbol-table-pointer integer, a number-of-symbols integer, a debugging-section integer, a major-linker-version integer, a minor-linker-version integer, a code-section-size integer, an initialized-data-size integer, an uninitialized-data-size integer, a Real Virtual Address ("RVA") entry-point integer, an RVA-start-of-code-section integer, an RVA-base-of-code-section integer, an RVA-start-of-data-section integer, a base-of-image integer, a has-imports integer, a has-delayed-imports integer, an External-Binding-Facilities integer, a no-in-out integer, a urlmon-imports integer, a thread-level-speculation integer, a msvcrt-imports integer, an oleaut32-imports integer, a setupapi-imports integer, a user32-imports integer, an advapi32-imports integer, a shell32-imports integer, a gdi32-imports integer, a comdlg32-imports integer, an imm32-imports integer, a has-certificate integer, a node integer, and/or a number-of-sections-integer.

According to certain embodiments, a system may comprise an examination module programmed to examine a plurality of header fields of a plurality of known-clean-executable files and examine a plurality of header fields of a plurality of known-malicious-executable files. The system may also include a database configured to store information obtained by the examination module and a deduction module programmed to deduce, based on the information obtained from the examination module, header-field attributes indicative of malware.

In certain embodiments, the system may comprise a security system programmed to receive an unknown-executable file and/or determine whether the unknown-executable file comprises malware by determining whether the unknown-executable file comprises the header-field attributes indicative of malware. In at least one embodiment, the security module may be further programmed to perform a security action if the unknown-executable file comprises malware.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments described herein. This exemplary description is not intended to be exhaustive or to be limited to any precise form disclosed. Many modifications and variations are possible without departing from the spirit and scope of the instant disclosure. It is desired that the embodiments described herein be considered in all respects illustrative and not restrictive and that reference be made to the appended claims and their equivalents for determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for detecting malware, the computer-implemented method comprising:
    examining a plurality of metadata fields of a plurality of known-clean-executable files;
    examining a plurality of metadata fields of a plurality of known-malicious-executable files;
    deducing, based on information obtained from examining the plurality of metadata fields of the plurality of known-clean- and known-malicious-executable files, metadata-field attributes indicative of malware, wherein deducing metadata-field attributes indicative of malware comprises determining at least one combination of metadata-field attributes indicative of malware that includes a node integer;
    receiving an unknown-executable file; and
    determining whether the unknown-executable file comprises malware by determining whether the unknown-executable file comprises the metadata-field attributes indicative of malware.

2. The computer-implemented method of claim 1, further comprising:
    performing a security action by adding the unknown-executable file to a list of malware files when the unknown-executable file comprises malware.

3. The computer-implemented method of claim 1, wherein:
    the plurality of known-clean-executable files comprise portable-executable files;
    the plurality of known-malicious-executable files comprise portable-executable files;
    the metadata-field attributes indicative of malware comprise header-field attributes that include at least one imports integer.

4. The computer-implemented method of claim 1, wherein the metadata-field attributes indicative of malware comprise at least one of:
    an image-subsystem attribute;
    a real-virtual-address attribute;
    a minimum-subsystem-version attribute;
    a dynamic-link-library-characteristics attribute;
    a no-in-out attribute;
    a thread-level-speculation attribute.

5. The computer-implemented method of claim 1, wherein:
    the metadata-field attributes indicative of malware comprise a subset of attributes from the plurality of metadata fields examined in the plurality of known-clean-executable files and known-malicious-executable files;
    the metadata-field attributes indicative of malware comprise a real-virtual address integer.

6. The computer-implemented method of claim 1, wherein the metadata-field attributes indicative of malware comprise a user-interface integer.

7. The computer-implemented method of claim 1, wherein: deducing metadata-field attributes indicative of malware comprises determining that a first metadata-field attribute indicative of malware is a stronger indicator of malware than a second metadata-field attribute indicative of malware.

8. The computer-implemented method of claim 1, tangibly embodied as computer-executable instructions on at least one non-transitory computer-readable medium.

9. A computer-implemented method for detecting malware, the computer-implemented method comprising:
    examining a plurality of metadata fields of a plurality of known-clean-portable-executable files;
    examining a plurality of metadata fields of a plurality of known-malicious-portable-executable files;
    deducing, based on information obtained from examining the plurality of metadata fields of the plurality of known-clean- and known-malicious-portable-executable files, metadata-field attributes indicative of malware, wherein the metadata-field attributes indicative of malware comprise at least two of:
        a graphical-user-interface integer;
        a character-based-user-interface integer;
        a real-virtual-address-entry-point integer;
        a real-virtual-address-start-of-code-section integer;
        a real-virtual-address-base-of-code-section integer;
        a real-virtual-address-start-of-data-section integer;
        a has-delayed-imports integer;
        an external-binding-facilities integer;
        a no-in-out integer;
        a urlmon-imports integer;
        a thread-level-speculation integer;
        an msvcrt-imports integer;
        an oleaut32-imports integer;
        a setupapi-imports integer;
        a user32-imports integer;
        an advapi32-imports integer;
        a shell32-imports integer;
        a gdi32-imports integer;
        a comdlg32-imports integer;
        an imm32-imports integer;
        a has-certificate integer;
        a node integer;
    receiving an unknown-executable file;
    determining whether the unknown-executable file comprises malware by determining whether the unknown-executable file comprises the metadata-field attributes indicative of malware.

10. The computer-implemented method of claim 9, wherein the metadata-field attributes indicative of malware comprise at least one of:
    an image-subsystem attribute;
    a real-virtual-address attribute;
    a minimum-subsystem-version attribute;
    a dynamic-link-library-characteristics attribute.

11. The computer-implemented method of claim 9, further comprising:
    performing a security action if the unknown-executable file comprises malware, wherein the security action comprises at least one of:
        reporting the unknown-executable file to a security-software vendor;
        adding the unknown-executable file to a list of malware files.

12. The computer-implemented method of claim 9, tangibly embodied as computer-executable instructions on at least one non-transitory computer-readable medium.

13. A system comprising:
an examination module programmed to:
- examine a plurality of header fields of a plurality of known-clean-executable files;
- examine a plurality of header fields of a plurality of known-malicious-executable files;

a database in communication with the examination module and configured to store information obtained by the examination module;

a deduction module programmed to deduce, based on the information obtained from the examination module, header-field attributes indicative of malware, wherein deducing header-field attributes indicative of malware comprises determining at least one combination of header-field attributes indicative of malware that includes a node integer;

one or more processors programmed to execute the examination module and the deduction module; and a security system programmed to:
- receive an unknown-executable file;
- determine whether the unknown-executable file comprises malware by determining whether the unknown-executable file comprises the header-field attributes indicative of malware.

14. The system of claim 13, wherein the security system is further programmed to report the unknown-executable file to a security-software vendor when- the unknown-executable file comprises malware.

15. The system of claim 13, wherein the header-field attributes indicative of malware comprise at least one of:

an image-subsystem attribute;

a real-virtual-address attribute;

a minimum-subsystem-version attribute;

a dynamic-link-library-characteristics attribute;

a no-in-out attribute;

a thread-level-speculation attribute.

16. The system of claim 13, wherein the header-field attributes indicative of malware comprise a dynamic-link-library characteristics attribute.

* * * * *